Patented Apr. 4, 1950

2,502,423

UNITED STATES PATENT OFFICE 2,502,423

4-CARBALKOXY-3-KETO-2-SUBSTITUTED TETRAHYDROTHIOPHENE OXIMES

Lee C. Cheney, Syracuse, N. Y., and John Robert Piening, Detroit, Mich., assignors to Parke, Davis & Company, Detroit, Mich., a corporation of Michigan No Drawing. Original application December 23, 1944, Serial No. 569,639. Divided and this application April 1, 1946, Serial No. 658,874

4 Claims. (Cl. 260—329)

The invention relates to new compounds and methods for preparation of the same. This application is a division of our copending application Serial No. 569,639, filed December 23, 1944, now Patent No. 2,443,598, issued June 22, 1948.

This divisional application relates more particularly to the preparation of certain intermediate oxime compounds having the general formula,

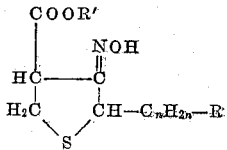

wherein R' is a lower saturated alkyl group, $n$ is 1 to 8 and the alkyl chain ($-C_nH_{2n}-$) may be straight or branched and R is a radical of the class $-COOH$, $-COOM$, $-COOR'$, aryloxy, aralkoxy and alkoxy, the group M representing a salt-forming basic group or metal such as sodium or other alkali metal, alkaline earth metals, magnesium, ammonium and substituted ammonium, such as monoalkyl and dialkylammonium.

These new compounds are useful as intermediates in the synthesis of compounds of medicinal interest, particularly of compounds possessing biotin or possibly anti-biotin activity.

4-carboalkoxy-3-keto-2-alkyl-tetrahydrothiophenes having one of the above mentioned groups, R, substituted on a carbon atom of the 2-alkyl group, $-C_nH_{2n}-$, are prepared by methods disclosed in our application, Serial No. 551,619, filed August 28, 1944. Said method consists in an internal condensation in the presence of an alkali metal alkoxide of a β-carboalkoxyalkyl-α-carboalkoxyalkyl sulfide, wherein the alkyl carrying the α-carboalkoxy group also carries the substituent R. We have now found that these compounds are readily converted at the 3-keto group into their corresponding oximes by the action of a hydroxylamine salt in the presence of an acid-binding agent.

The process of the instant divisional application may be represented as follows:

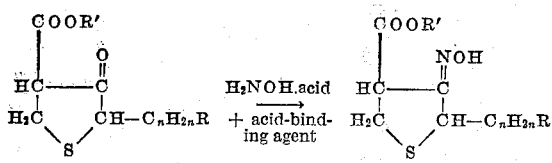

Suitable acid-binding agents include the bicarbonates, carbonates, oxides and hydroxides of the alkali and alkaline earth metals, the alkali salts of lower carboxylic acids, alkali metal alkoxides, ammonium hydroxide, and organic bases such as alkyl amines, pyridine, piperidine, etc.

The following examples illustrate methods of carrying out the invention, but its scope is not to be limited by the reactants and conditions cited therein, as will be apparent to those skilled in the art.

Example 1

*Ethyl 4-carbethoxy-3-keto-2-tetrahydrothiophenevalerate oxime.*—A solution of 30 g. (0.1 mole) of ethyl 4-carbethoxy-3-keto-2-tetrahydrothiophenevalerate in 300 ml. of absolute alcohol is refluxed on the steam bath with 34.8 g. (0.5 mole) of hydroxylamine hydrochloride and 59 g. (0.3 mole) of anhydrous barium carbonate for seven hours. The mixture is filtered and inorganic salt on the filter is washed with hot absolute alcohol. The alcohol is removed under reduced pressure and the residue is taken up in ether, washed with water and dried over sodium sulfate. Salt and then ether are removed and the residue dried over $P_2O_5$ in a vacuum desiccator. The oxime is an oil and weighs 29.87 g.; yield 94%.

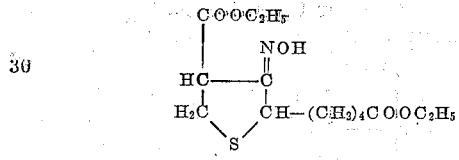

Example 2

*4-carbethoxy-3-keto-2-γ-phenoxypropyltetrahydrothiophene oxime.*—A mixture of 30.8 g. (0.1 mole) of 4-carbethoxy-3-keto-2-γ-phenoxypropyltetrahydrothiophene, 30.8 g. (0.443 mole) of hydroxylamine HCl, 46.2 g. (0.234 mole) of anhydrous $BaCO_3$ and 300 ml. of absolute alcohol is refluxed on the steam bath for 22 hours and then allowed to stand for two days. The solution is warmed and then filtered using suction. The inorganic residue is washed with 200 ml. of hot absolute alcohol. The filtrate is distilled at reduced pressure. The residue is dissolved in 800 ml. of ether and washed with 500 ml. of water in 3 portions. The ether extract is then dried over $Na_2SO_4$ for six hours. Ether is removed and the residue dried overnight in a vacuum desiccator over $P_2O_5$. In the morning the oxime has partially crystallized and is considered good enough for further synthesis. The yield is 30.35 g. or 94%. A portion of the thick semi-solid mass is treated with a small portion of 95% alcohol and the crystals which fail to dissolve are crystallized from 80% alcohol to obtain colorless crystals, M. P. 101° C.

*Anal.*—Calcd. for $C_{16}H_{21}O_4NS$: C, 59.42; H, 6.54; N, 4.33. Found: C, 59.26; H, 6.33; N, 4.56.

Its formula is,

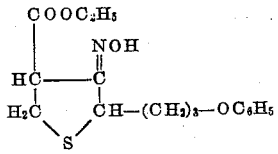

Example 3

*4-carbethoxy-3-keto - 2 - γ - benzyloxypropyltetrahydrothiophene oxime.*—A mixture of 189 g. (0.586 mole) of 4-carbethoxy-3-keto-2-α-benzyloxypropyltetrahydrothiophene, 189 g. (2.72 moles) of hydroxylamine hydrochloride, 296 g. (1.50 moles) of anhydrous $BaCO_3$ and 1500 ml. of absolute alcohol is refluxed on the steam bath for 22 hours. The inorganic salts are removed and washed with alcohol. The filtrate is distilled under reduced pressure to remove alcohol. The residue is taken up in 2 liters of ether and is washed with water and saturated NaCl solution, then dried over $Na_2SO_4$ for 18 hours. Ether is removed after filtering off $Na_2SO_4$. The oil is dried in a vacuum desiccator to constant weight. Yield 175 g.; 89%.

*Anal.*—Calcd. for $C_{17}H_{22}O_4S$: C, 63.32; H, 6.87. Found: C, 63.41; H, 6.61.

Its formula is,

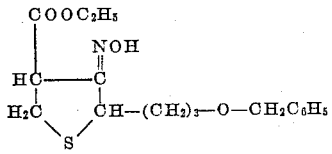

Although various reagents and reaction media can be used in the process of this invention, we prefer to use those compounds, dilutions and other conditions which do not result in any substantial hydrolysis of the ester group —COOR' at position 4 of the heterocyclic ring.

What we claim as our invention is:

1. An oxime of the formula,

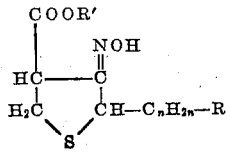

where R' is a lower alkyl radical, $n$ is an integer from 1 to 8 inclusive, R is a member of the class consisting of —COOH, —COOM, COOR', aryloxy, aralkoxy and alkoxy, M being a salt-forming basic group.

2. Ethyl 4-carbethoxy- 3- keto - 2 - tetrahydrothiophenevalerate oxime of formula,

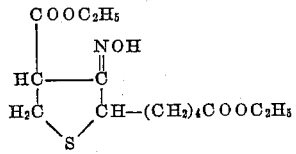

3. 4-carbethoxy-3-keto-2 - γ - phenoxypropyltetrahydrothiophene oxime of formula,

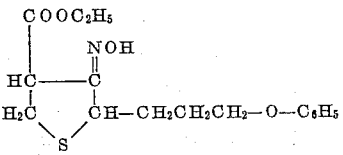

4. 4-carbethoxy-3 - keto-2-λ-benzyloxypropyltetrahydrothiophene oxime.

LEE C. CHENEY.
JOHN ROBERT PIENING.

REFERENCES CITED

The following references are of record in the file of this patent:

UNITED STATES PATENTS

| Number | Name | Date |
|---|---|---|
| 2,417,326 | Schnider | Mar. 11, 1947 |

OTHER REFERENCES

Karrer, Helv. Chim. Acta, 27, 131 and 137 (Feb. 1, 1944).

Degering: An Outline of Organic Nitrogen Compounds, pages 169 and 176. University Lithoprinters, Ypsilanti, Michigan, 1945.

Shriner and Fuson: The Systematic Identification of Organic Compounds, page 145, Wiley, N. Y., 1940.